United States Patent
Saito et al.

(10) Patent No.: US 11,188,291 B2
(45) Date of Patent: Nov. 30, 2021

(54) AUDIO SIGNAL PROCESSING APPARATUS, METHOD FOR PROCESSING AUDIO SIGNAL, AND STORAGE MEDIUM STORING PROGRAM

(71) Applicant: YAMAHA CORPORATION, Hamamatsu (JP)

(72) Inventors: Kosuke Saito, Hamamatsu (JP); Minoru Suzuki, Iwata (JP)

(73) Assignee: YAMAHA CORPORATION, Hamamatsu (JP)

( * ) Notice: Subject to any disclaimer, the term of this patent is extended or adjusted under 35 U.S.C. 154(b) by 27 days.

(21) Appl. No.: 16/733,695

(22) Filed: Jan. 3, 2020

(65) Prior Publication Data
US 2020/0241832 A1 Jul. 30, 2020

(30) Foreign Application Priority Data
Jan. 30, 2019 (JP) .............................. JP2019-014030

(51) Int. Cl.
| | | |
|---|---|---|
| *G06F 3/16* | (2006.01) | |
| *G06F 3/0481* | (2013.01) | |
| *G06F 3/0484* | (2013.01) | |

(52) U.S. Cl.
CPC ............ *G06F 3/165* (2013.01); *G06F 3/0481* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 2004/0243630 A1* | 12/2004 | Kanie | ................... | G06F 3/0629 |
| 2004/0249863 A1* | 12/2004 | Kawamura | ........... | G06F 16/258 |
| 2005/0114787 A1* | 5/2005 | Takayama | ............. | G06F 40/117 |
| | | | | 715/764 |
| 2006/0020754 A1* | 1/2006 | Suzuki | ................ | G06F 11/2064 |
| | | | | 711/114 |
| 2007/0064962 A1* | 3/2007 | Terada | ................... | H04H 60/04 |
| | | | | 381/119 |

FOREIGN PATENT DOCUMENTS

| | | |
|---|---|---|
| JP | 2007074325 A | 3/2007 |
| JP | 2016225691 A | 12/2016 |

OTHER PUBLICATIONS

Extended European Search Report issued in European Appln. No. 20154446.7 dated Jul. 2, 2020.
Yamaha. "PM1D System Software V1.6 Supplementary Manual." PM1D Digital Audio Mixing System. Jan. 1, 2003. 56 pages. Cited in NPL 1.
Yamaha. "O2R96 Digital Mixing Console Owner's Manual." O2R96 Digital Mixing Console. Mar. 20, 2002. 315 pages. Cited in NPL 1.

* cited by examiner

*Primary Examiner* — Toan H Vu
(74) *Attorney, Agent, or Firm* — Rossi, Kimms, & McDowell LLP

(57) ABSTRACT

An audio signal processing apparatus includes a preset setting task that receives setting of a preset that defines a parameter to be copied, a copy-source selecting task that receives a selection of a copy-source channel, a preset selecting task that receives a selection of the preset, a copy-destination selecting task that receives a selection of a copy-destination channel, and a copying task that copies the parameter of the selected preset to be copied from the copy-source channel to the copy-destination channel.

17 Claims, 9 Drawing Sheets

AUDIO SIGNAL PROCESSING APPARATUS, METHOD FOR PROCESSING AUDIO SIGNAL, AND STORAGE MEDIUM STORING PROGRAM

CROSS REFERENCE TO RELATED APPLICATIONS

This Nonprovisional application claims priority under 35 U.S.C. § 119(a) on Patent Application No. 2019-014030 filed in Japan on Jan. 30, 2019 the entire contents of which are hereby incorporated by reference.

BACKGROUND OF THE INVENTION

1. Technical Field

A preferred embodiment of the present invention relates to an audio signal processing apparatus, a method for processing an audio signal, and a storage medium storing a program.

2. Description of the Related Art

Japanese Unexamined Patent Application Publication No. 2007-074325 discloses a channel copy function of copying content of a parameter of one channel onto another channel.

SUMMARY OF THE INVENTION

An audio signal processing apparatus according to a preferred embodiment of the present invention includes a user interface, a memory storing instructions, and a processor that implements the instructions to execute a plurality of tasks. The plurality of tasks including a preset setting task that receives setting of a preset that defines a parameter to be copied, a copy-source selecting task that receives a selection of a copy-source channel, a preset selecting task that receives a selection of the preset, a copy-destination selecting task that receives a selection of a copy-destination channel, and a copying task that, copies the parameter of the selected preset to be copied from the copy-source channel to the copy-destination channel.

BRIEF DESCRIPTION OF THE DRAWINGS

FIG. 7 is a flow chart showing an operation of the CPU 18 in a case of copying a plug-in.

DETAILED DESCRIPTION OF THE PREFERRED EMBODIMENTS

Conventionally, in a case of copying a channel, a user has a parameter that the user desires to copy and a parameter that the user does not desire to copy.

Accordingly, an object of a preferred embodiment of the present invention is to provide an audio signal processing apparatus, a method for processing an audio signal, and a program that are able to easily copy only a parameter to be copied, in copying a channel.

According to a preferred embodiment of the present invention, in copying a channel, only a parameter that the user desires to copy is able to be copied easily.

Figure 1A:
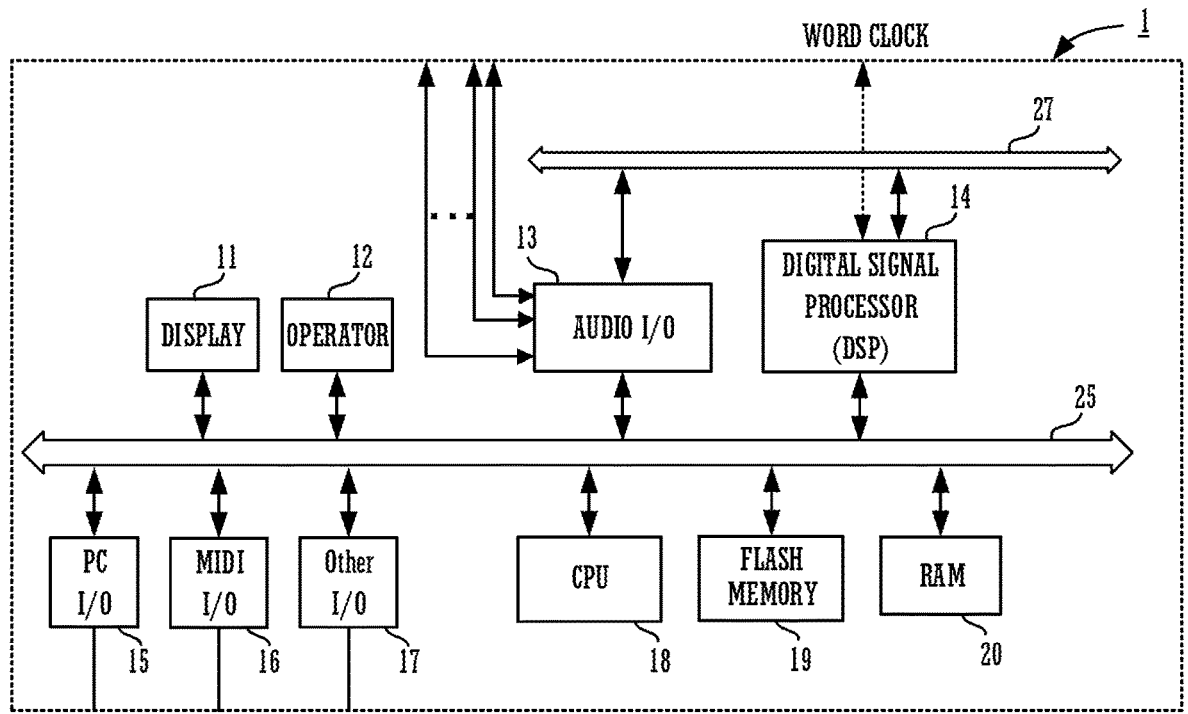
FIG. 1A is a block diagram showing a configuration of an audio mixer.
Figure 1B:
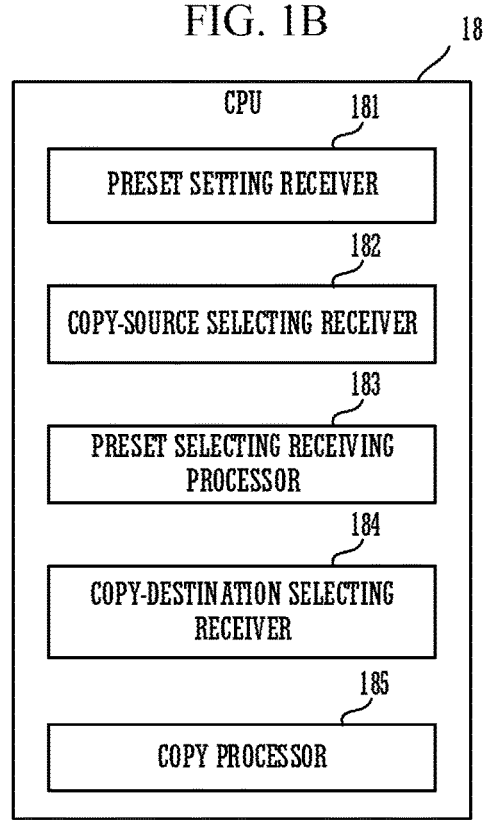
FIG. 1B is a block diagram showing a main configuration of a CPU.

FIG. 1A is a block diagram showing a configuration of a mixer 1. FIG. 1B is a block diagram showing a main configuration of a CPU 18 of mixer 1. The mixer 1 is an example of an audio signal processing apparatus according to the present invention. The mixer 1 includes a display 11, an operator 12, an audio I/O (Input/Output) 13, a digital signal processor 14, a PC I/O 15, a MIDI I/O 16, other I/O 17, a CPU 18, a flash memory 19, and a RAM 20.

The display 11, the operator 12, the audio I/O 13, the digital signal processor 14, the PC I/O 15, the MIDI I/O 16, the other I/O 17, the CPU 18, the flash memory 19, and the RAM 20 are connected to one another through a bus 25. Further, the audio I/O 13 and the digital signal processor 14 are also connected to a waveform bus 27 in order to transmit a digital audio signal.

The audio I/O 13 is an interface for receiving an input of an audio signal to be processed in the digital signal processor 14. The audio I/O 13 includes an analog input port, a digital input port, or the like to receive the input of an audio signal. In addition, the audio I/O 13 is an interface for outputting an audio signal that has been processed in the digital signal processor 14. The audio I/O 13 includes an analog output port, a digital output port, or the like to output the audio signal.

Each of the PC I/O 15, the MIDI I/O 16, and the other I/O 17 is an interface that connects various types of external devices and performs input and output. The PC I/O 15 connects an external PC, for example. The MIDI I/O 16 connects a MIDI compatible device such as a physical controller or an electronic musical instrument, for example. The other I/O 17 connects a display, for example. Alternatively, the other I/O 17 connects a UI (User Interface) device such as a mouse or a keyboard. Any standards such as Ethernet (registered trademark) or a USB (Universal Serial Bus) are able to be employed for communication with the external devices. A wired or wireless connection may be used.

The CPU 18 is a controller that controls an operation of the mixer 1. The CPU 18 reads out a predetermined program stored in the flash memory 19 being a storage (a storage medium) to the RAM 20 and performs various types of operations.

As shown in FIG. 1B, the CPU 18 includes a preset setting receiver (a preset setting task) 181, a copy-source selecting receiver (a copy-source selecting task) 182, a preset selecting receiving processor (a preset selecting task) 183, a copy-destination selecting receiver (a copy-destination selecting task) 184, and a copy processor (copying task) 185. The preset setting receiver 181 receives setting of a preset that defines a parameter to be copied. The copy-source selecting receiver 182 receives a selection of a copy-source channel. The preset selecting receiving processor 183 receives a selection of the preset. The copy-destination selecting receiver 184 receives a selection of a copy-destination channel. The copy processor 185, based on the parameter to be copied, the parameter being defined in a selected preset, copies a parameter of the copy-source channel to a parameter of the copy-destination channel.

In addition, the CPU 18 executes a program, stored in the flash memory 19, to configure the preset setting receiver that receives setting of the preset that defines the parameter to be copied, the copy-source selecting receiver that receives the selection of the copy-source channel, a preset selecting receiving processor that receives the selection of the preset, the copy-destination selecting receiver that receives the selection of the copy-destination channel, and the copy processor that, based on the parameter to be copied, the parameter being defined in the selected preset, copies the parameter of the copy-source channel to the parameter of the copy-destination channel. It is to be noted that it is not necessary to store the program in the flash memory 19 of an own apparatus. For example, the program may be downloaded each time from another device such as a server and may be read out to the RAM 20.

The display 11 displays various types of information according to the control of the CPU 18. The display 11 includes an LCD or a light emitting diode (LED), for example.

The operator 12 receives an operation to the mixer 1, from a user. The operator 12 includes various types of keys, buttons, rotary encoders, sliders, and the like. In addition, the operator 12 may include a touch panel laminated on the LCD being the display 11.

The digital signal processor 14 is comprised with a plurality of DSPs for performing various types of signal processing such as mixing processing or effect processing. The digital signal processor 14 performs effect processing such as mixing or equalizing on an audio signal inputted from the audio I/O 13 through the waveform bus 27. The digital signal processor 14 outputs a digital audio signal subjected to the signal processing, to the audio I/O 13 again through the waveform bus 27.

Figure 2:
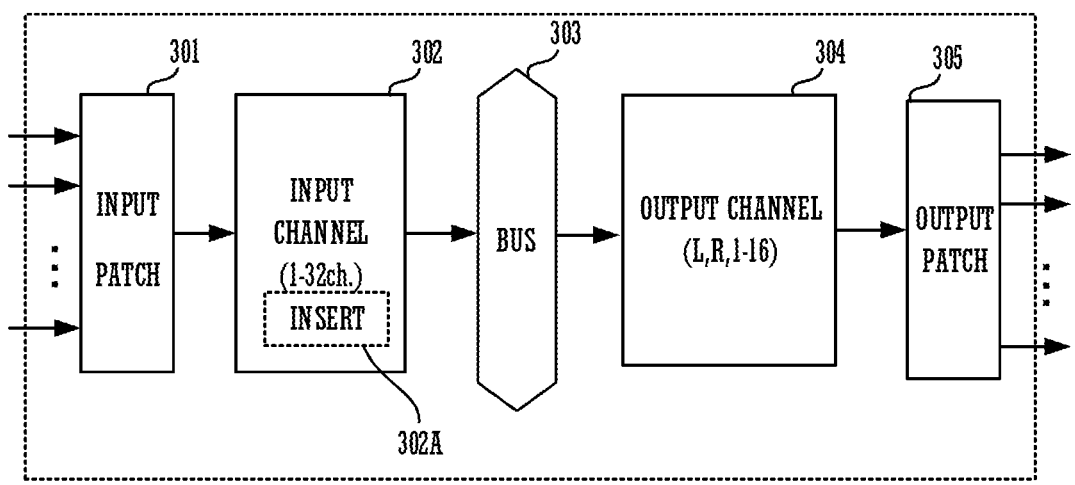
FIG. 2 is an equivalent block diagram of signal processing to be performed in a digital signal processor 14, an audio I/O 13, and a CPU 18.

FIG. 2 is an equivalent block diagram of signal processing to be performed in the digital signal processor 14, the audio I/O 13, and the CPU 18. As shown in FIG. 2, the signal processing is functionally performed by an input patch 301, an input channel 302, a bus 303, an output channel 304, and an output patch 305.

The input patch 301 receives an input of audio signals from a plurality of input ports (an analog input port or a digital input port, for example) in the audio I/O 13. The input patch 301 assigns any one of a plurality of ports to at least one of a plurality of channels (32 channels, for example).

The input channel 302 applies inputted audio signals to predetermined signal processing at each channel. The input channel 302 outputs the audio signal to which the signal processing applied at each channel to the bus 303 provided in the subsequent stage. The bus 303 includes a plurality of types of the buses such as a stereo bus (an L bus, an R bus) and a MIX bus.

The output channel 304 includes a plurality of channels, similarly to the bus 303. The output channel 304, similarly to the input channel, applies various types of signal processing to inputted audio signals at each channel.

The output channel 304 outputs the audio signal to which the signal processing is applied to the output patch 305. The output patch 305 assigns each channel to any one of a plurality of ports including an analog output port and a digital output port. Accordingly, the audio signal subjected to the signal processing is input to the audio I/O 13.

The signal processing described above is controlled based on a value of each parameter. The CPU 18 stores a current value (current data) of each parameter in the RAM 20. The CPU 18 updates the current data when a user operates the operator 12.

In addition, the input channel 302 includes an insertion point (INSERT) 302A for inserting a plug-in effect. The user operates the operator 12, to give an instruction to install a plug-in in the INSERT 302A, and can thus connect the plug-in to a desired signal processing block. It is to be noted that the INSERT 302A may be also able to be installed in the output channel 304.

The CPU 18 assigns the processing capability (resource) of the DSP comprising the digital signal processor 14 to a plug-in, and causes the plug-in to be mounted. Accordingly, the CPU 18 causes the digital signal processor 14 to perform signal processing corresponding to the plug-in. Hereinafter, "mounting a plug-in" means assigning some resource of a DSP to a plug-in and causing the DSP to perform signal processing of the plug-in.

The signal processing by the plug-in is also controlled based on a current value (current data) of a parameter. The parameter of the plug-in is also included in the current data. The plug-in is a parameter for achieving various types of effects such as reverb, delay, or chorus, and is stored in the flash memory 19. The parameter is read out from the flash memory 19 and stored in the RAM 20 as current data. In this manner, the digital signal processor 14 mounts a plug-in, and performs signal processing.

Figure 3:
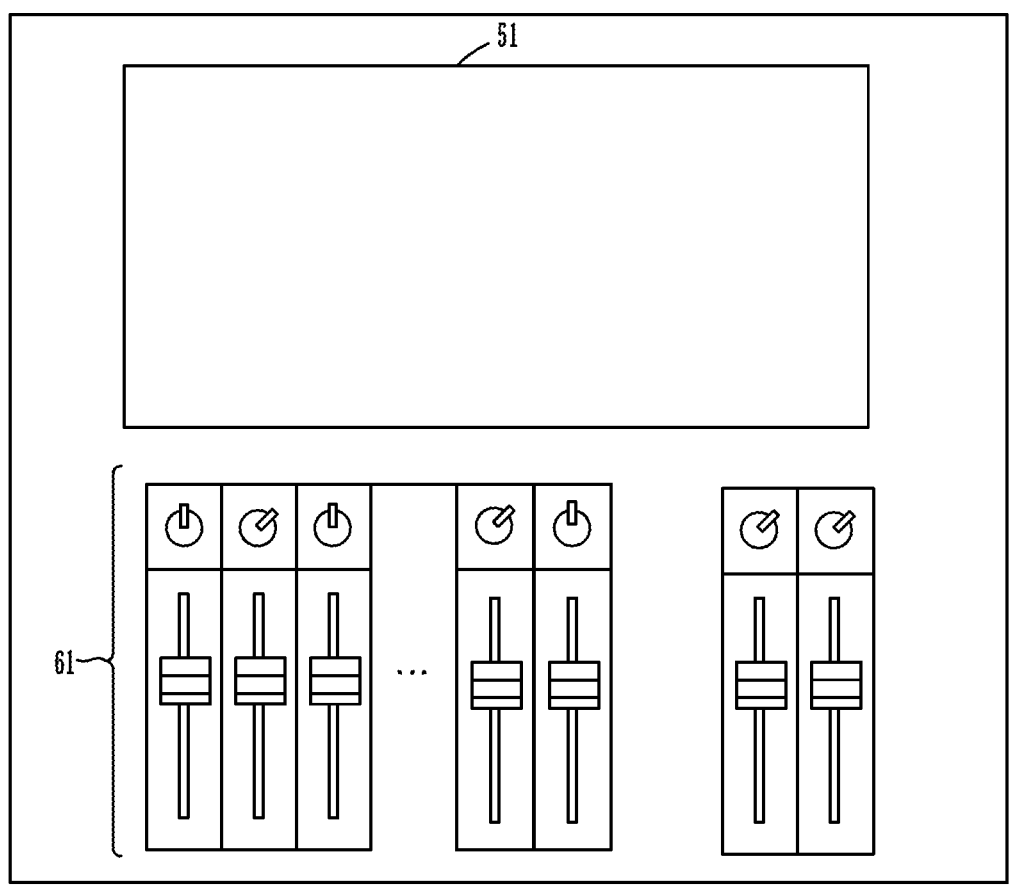
FIG. 3 is a diagram showing a configuration of an operation panel of a mixer 1.

FIG. 3 is a view showing a configuration of an operation panel of the mixer 1. On the operation panel of the mixer 1, as shown in FIG. 3, a touch screen 51, a channel strip 61, and the like are provided. These components correspond to the display 11 and the operator 12 shown in FIG. 1A. It is to be noted that, although FIG. 3 shows only the touch screen 51 and the channel strip 61, in practice, a large number of knobs, switches, or the like may be provided.

The touch screen 51 is the display 11 on which the touch panel, which is described as one preferred embodiment of the operator 12, is mounted, and displays a GUI (Graphical User Interface) screen for receiving an operation from a user.

The channel strip 61 is an area in which a plurality of physical controllers that receive an operation with respect to one channel are disposed vertically. Although, in FIG. 3, only one fader and one knob, as the physical controllers, are shown for each channel, in practice, a large number of knobs, switches, or the like may be provided. In the channel strip 61, a plurality of faders and knobs disposed on the left side correspond to input channels. The two faders and two knobs disposed on the right side are physical controllers corresponding to a master output (a stereo bus). It is to be noted that, in this preferred embodiment, the physical controller, while being displayed as an image, may be a physical operation mechanism such as a slider included in the operator 12, for example.

Figure 4:
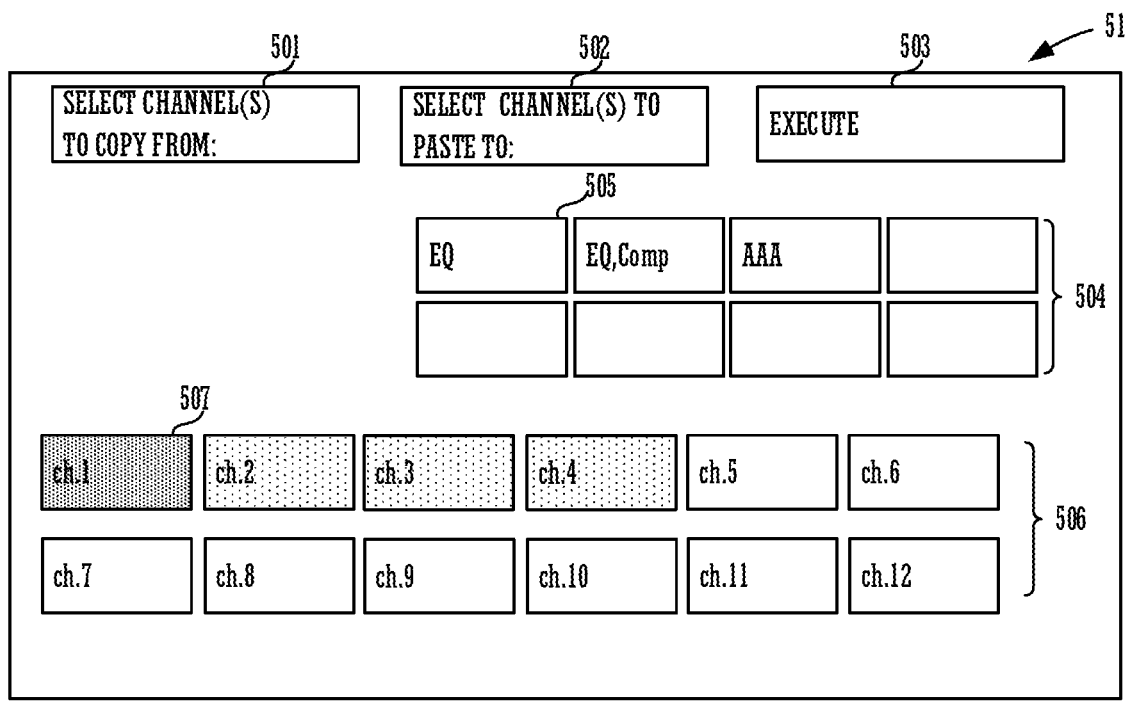
FIG. 4 is a diagram showing an example of a GUI.

FIG. 4 is a diagram showing a channel copy screen as an example of a GUI. The channel copy screen includes a copy-source channel selection button 501, a copy-destination channel selection button 502, an execution button 503, a preset button group 504, and a channel button group 506. The preset button group 504 includes a plurality of preset buttons 505. The channel button group 506 includes a plurality of channel buttons 507.

A user, by operating the copy-source channel selection button 501, the copy-destination channel selection button 502, the execution button 503, the preset button group 504, and the channel button group 506 on the channel copy screen, can copy a parameter of any one channel or parameters of a plurality of channels, onto a parameter of any one channel or parameters of a plurality of channels.

Figure 5:
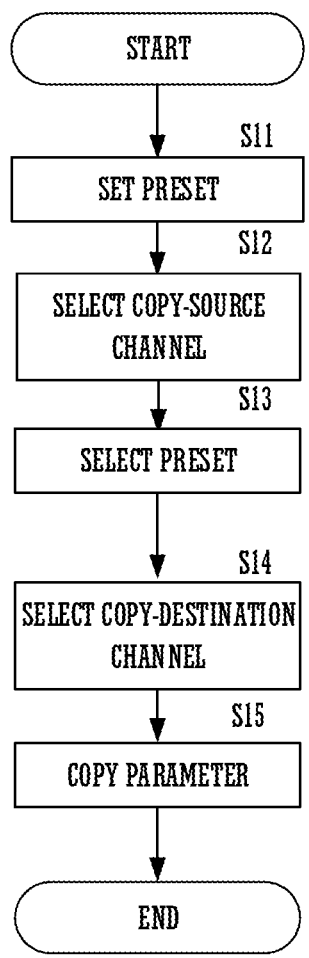
FIG. 5 is a flow chart showing an operation of copying a channel.
Figure 6:
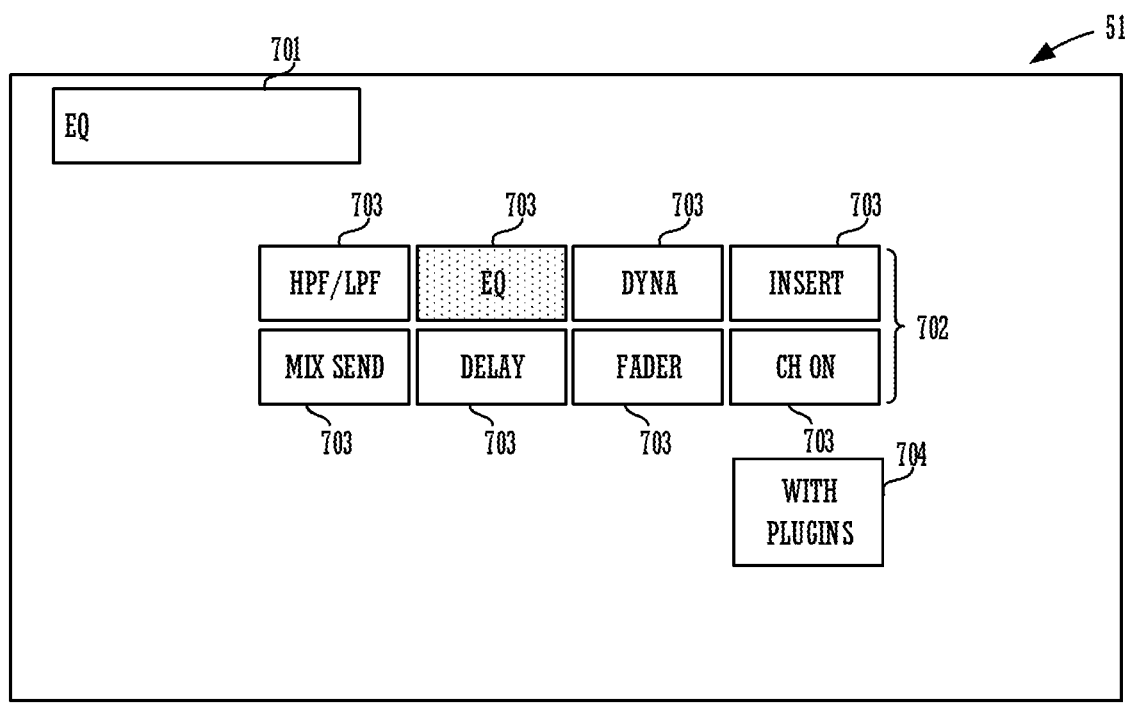
FIG. 6 is a diagram showing a preset edit screen.

FIG. 5 is a flow chart showing an operation of copying a channel. The CPU 18 (the preset setting receiver 181) first receives the setting of a preset (S11). For example, when a user presses and holds any of the plurality of preset buttons 505 of the preset button group 504, a preset edit screen shown in FIG. 6 is displayed. FIG. 6 shows the example displayed on the display 11 when the user presses and holds a button displayed as "EQ" among the plurality of preset buttons 505 of FIG. 5.

The preset edit screen includes a preset name 701, a parameter group 702, and a plug-in button 704. The parameter group 702 includes a plurality of parameter buttons 703. The CPU 18 (the preset setting receiver 181) sets setting of a preset on the preset edit screen by the user's operation. The setting of a preset includes a preset name and a target of a parameter to be copied.

When a user selects the preset name 701, the preset setting receiver 181 changes the name of a preset. In addition, the preset setting receiver 181 may set the color of the preset by the user's operation. In the example of FIG. 6, the name of "EQ" is set. In the example of FIG. 6, the user selects the EQ among the plurality of parameter buttons 703. Therefore, when the preset button 505 of the preset name "EQ" is selected by the user, the CPU 18 copies the parameter of an equalizer as signal processing.

Returning to FIG. 5, the CPU 18 (the copy-source selecting receiver 182) receives a selection of a copy-source channel (S12). When the user selects the copy-source channel selection button 501 in FIG. 4 and also selects each channel button 507 of the channel button group 506, the copy-source selecting receiver 182 performs the selection of a copy-source channel. In the example of FIG. 4, an input channel 1 is selected by the user as a copy-source channel.

Subsequently, the CPU 18 (the preset selecting receiving processor 183) receives a selection of a preset (S13). When the user selects each preset button 505 of the preset button group 504 in FIG. 4, the preset selecting receiving processor 183 performs the selection of the preset. In the example of FIG. 4, "EQ" is selected by the user as a preset.

Next, the CPU 18 (the copy-destination selecting receiver 184) receives a selection of a copy-destination channel (S14). When the user selects the copy-destination channel selection button 502 in FIG. 4 and also selects each channel button 507 of the channel button group 506, the copy-destination selecting receiver 184 performs the selection of the copy-destination channel. In the example of FIG. 4, an input channel 2, an input channel 3, and an input channel 4 are selected by the user as a copy-destination channel.

Finally, when the user selects the execution button 503, the CPU 18 (the copy processor 185) performs copy processing of a parameter based on a selected preset (S15). In the example of FIG. 4, the CPU 18 (the copy processor 185) copies the parameter of an equalizer, among the parameters of the input channel 1, to the input channel 2, the input channel 3, and the input channel 4.

In this manner, the mixer 1 according to the present preferred embodiment, in copying a channel, is able to select a parameter to be copied and a parameter not to be copied, simply by selecting a preset. Therefore, a user, in copying a channel, does not need to select a parameter that the user desires to copy, from all the parameters each time.

Figure 7:
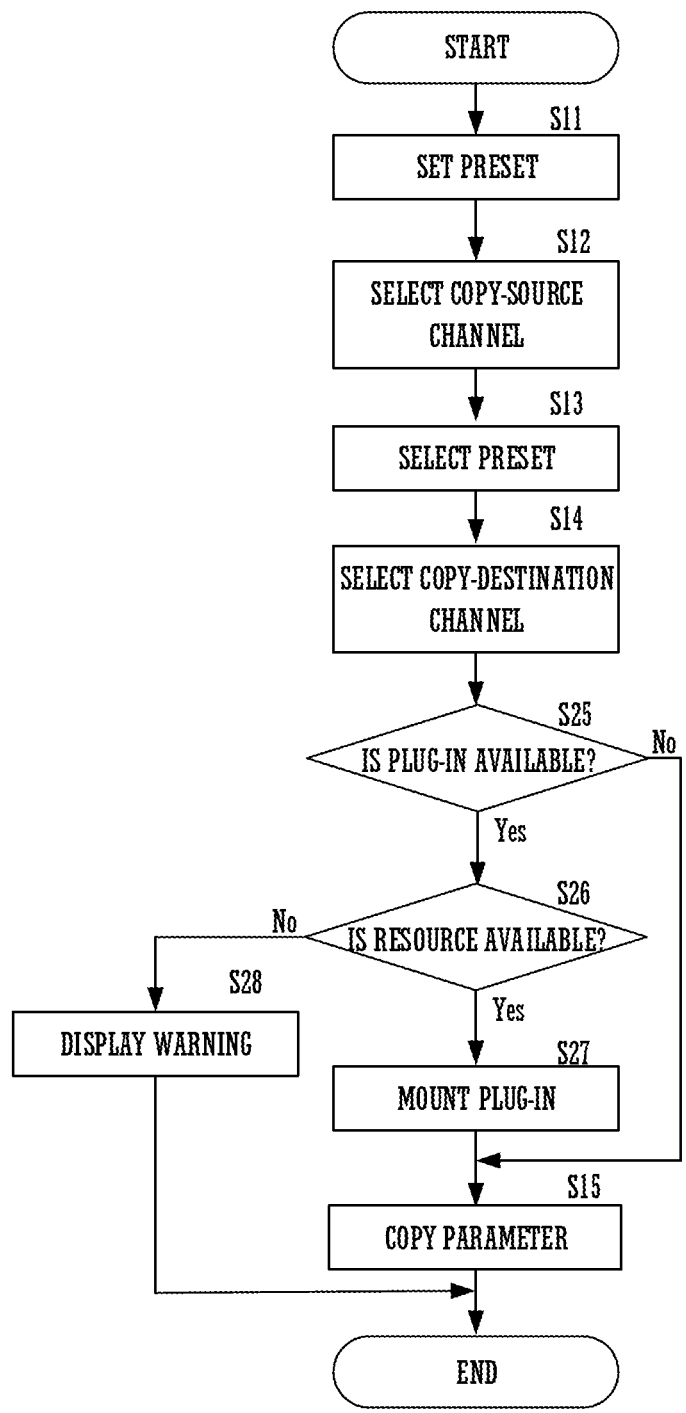

FIG. 7 is a flow chart showing an operation of the CPU 18 in a case of copying a plug-in. Like reference numerals are used to refer to processing common to the processing in FIG. 5, and the description is omitted.

The CPU 18 determines whether or not to copy a plug-in after receiving the selection of a copy-destination channel (S25). In other words, the CPU 18 (a plug-in determining task) determines whether the setting of the selected preset includes information about a plug-in. As shown in FIG. 6, the setting of a preset includes information on a plug-in. When the plug-in button 704 is selected by the user, CPU 18 also copies the plug-in. The CPU 18, in determining not to copy the plug-in, copies the parameter (S15).

Figure 8:
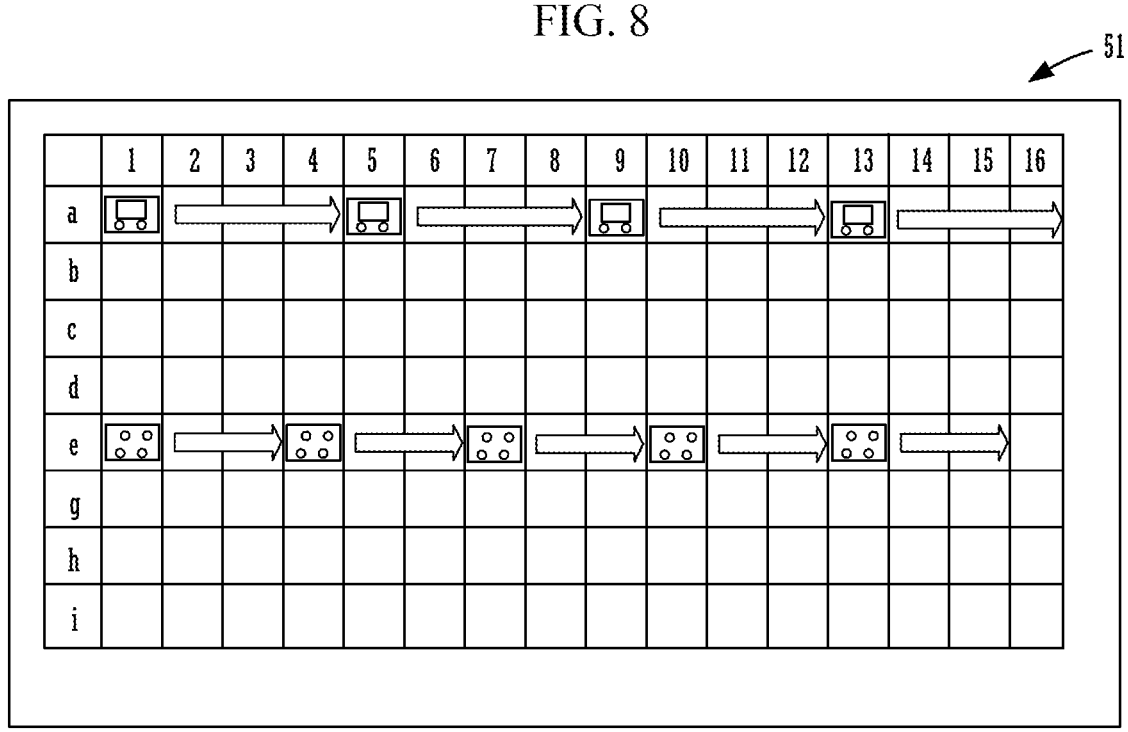
FIG. 8 is an allocation screen schematically showing DSP resource.

The CPU 18, in copying a plug-in, first checks DSP resource (S26). In other words, the CPU 18 (a resource determining task) determines whether a resource necessary for a plug-in to be mounted is available. FIG. 8 is an allocation screen schematically showing the DSP resource. The CPU 18, as shown on the allocation screen of FIG. 8, ensures the DSP resource previously as a plurality of blocks (16×8 blocks in the example of FIG. 8). In the example of FIG. 8, four plug-ins occupying four blocks and five plug-ins occupying three blocks are mounted. Therefore, in this state, the DSP resource is available.

Next, the CPU 18, when the DSP resource is available, mounts a corresponding plug-in (S27). In other words, the CPU (a plug-in mounting task) mounts a corresponding plug-in, in a case where the plug-in determining task determines that the setting of the selected preset includes the information about the plug-in. The corresponding plug-in includes the same plug-in, for example. In the example of FIG. 4, in a case in which delay is set to the input channel 1 as a plug-in effect, the CPU 18 newly mounts the same delay plug-in, as an effect to the input channel 2, the input channel 3, and the input channel 4. Further, the CPU 18, in the processing of S15, also copies the parameter that has been set to the plug-in of the input channel 1. As a result, the CPU 18 copies a plug-in, after receiving the selections of a copy-destination channel. It is to be noted that the corresponding plug-in includes a similar plug-in. The similar plug-in includes a plug-in manufactured by the same manufacturer, the same type of plug-in, or a similar type of plug-in. The type means an effect name or a model name, for example. For example, even when effects of plug-ins are different, a plug-in having the same effect name such as "delay" is considered as the same type of plug-in. In addition, even when manufacturers or types of plug-ins are different, the user may register the plug-ins previously as the similar plug-ins in an initial setting or other settings. In such a case, the CPU 18 sets the plug-ins registered previously, as the similar plug-ins, to the copy-destination channel.

On the other hand, the CPU 18 (a warning task) displays a warning in a case in which the DSP resource is unavailable (S28). In such a case, the CPU 18 ends the processing without mounting a plug-in. When CPU 18 displays a warning on the display 11, the user can know that the DSP resource is unavailable. The CPU 18, however, does not mount the plug-in and may end the processing without displaying a warning. In addition, the CPU 18 may stand by after displaying a warning, and may make determination of the processing S26 again after a lapse of a predetermined time. In such a case, when the user can manually unmount other plug-ins, the CPU 18 mounts a new plug-in in a case in which the DSP resource becomes available.

It is to be noted that the CPU 18, in mounting a plug-in to a plurality of channels as with the example of FIG. 4, may mount plug-ins sequentially to each channel, and may stop mounting by displaying a warning when the resource is fully occupied. In addition, in the flow chart of FIG. 7, although the CPU 18 previously checks the DSP resource before copying to the parameter of the copy-destination channel, the CPU 18 may copy the parameter first and then may check the DSP resource.

Normally, in a case of mounting a new plug-in, the user needs to mount a plug-in on the allocation screen shown in FIG. 8, and also needs to set a parameter. However, the mixer 1 according to the present preferred embodiment, by only receiving an instruction of copying a channel, mounts a plug-in and sets a parameter. Accordingly, when the user only issues the instruction of copying a channel, the mixer 1 can set a new plug-in to other channels.

Figure 9:
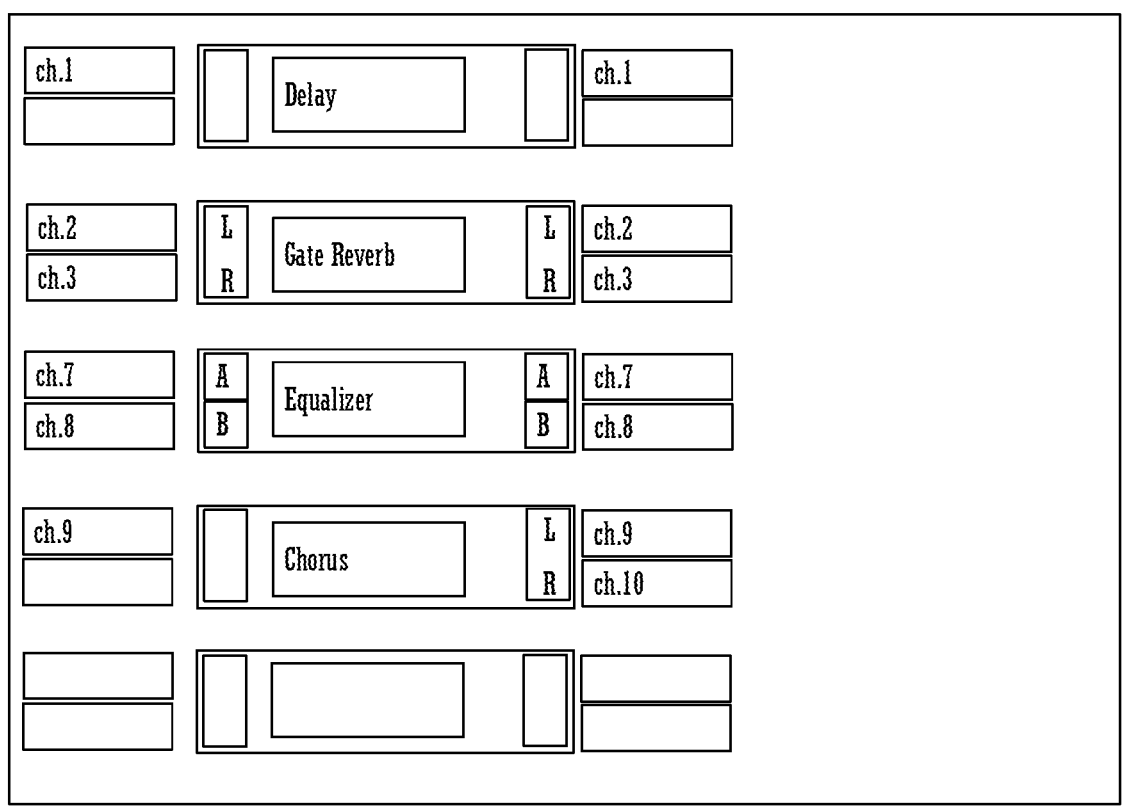
FIG. 9 is a diagram showing a plug-in list screen.

FIG. 9 shows a plug-in list screen. The plug-in list screen displays a channel of insert-in and insert-out for each plug-in.

The plug-in corresponds to a reproduction system such as a monaural reproduction system, a stereo reproduction system, or a dual monaural reproduction system. For example, a delay plug-in (Delay) shown in FIG. 9 corresponds to a monaural reproduction system. Both the in-side and out-side of the Delay, shown in FIG. 9, is connected to the input channel 1. A gated reverb plug-in (Gate Reverb) shown in FIG. 9 corresponds to a stereo reproduction system. Both the in-side and out-side of the Gate Reverb, shown in FIG. 9, are connected to the input channel 2 and the input channel 3. An equalizer plug-in (Equalizer) shown in FIG. 9 corresponds to a dual monaural reproduction system. Both the in-side and out-side of the Equalizer, shown in FIG. 9 are connected to an input channel 7 and an input channel 8. A chorus plug-in (Chorus) shown in FIG. 9 corresponds to the monaural reproduction system on the in-side, and corresponds to the stereo reproduction system on the out-side. The in-side of the Chorus, shown in FIG. 9, is connected to an input channel 9 and the out-side of the Chorus is connected to the input channel 9 and an input channel 10.

The CPU 18, in mounting a plug-in at the processing of S27, checks (compares between) the reproduction system of a copy-source channel, and the reproduction system of a copy-destination channel. The CPU 18, in a case in which the copy-source channel and the copy-destination channel are channels of different reproduction systems, mounts a plug-in of the reproduction system of the copy-destination channel, the plug-in also being of the same type as or similar type to the plug-in of the copy-source channel.

For example, in a case in which the copy-source channel is stereo (the input channel 2 and the input channel 3, for example), a plug-in corresponding to the stereo reproduction system is inserted into the copy-source channel. On the other hand, in a case in which the copy-destination channel is monaural (the input channel 1, for example), the CPU 18 mounts a plug-in corresponding to the monaural reproduction system. In addition, the CPU 18 mounts a plug-in of the same type as or similar type to the plug-in of the copy-source channel. For example, the CPU 18 may mount a gated reverb plug-in having the same effect name as the copy-source channel and corresponding to the monaural reproduction system.

In addition, in a case in which the copy-destination channel is dual monaural (the input channel 7 and the input channel 8, for example), the CPU 18 mounts a plug-in corresponding to the dual monaural reproduction system being a reproduction system of the copy-destination channel, without mounting a plug-in corresponding to the stereo reproduction system.

In addition, the CPU 18 may mount a plug-in of a different reproduction system. For example, the input channel 2 and the input channel 3 are stereo. The gated reverb plug-in corresponding to the stereo reproduction system is inserted into the input channel 2 and the input channel 3. For example, the gated reverb plug-in corresponding to the stereo reproduction system may be inserted into the monaural channel 4. In such a case, the CPU 18 copies the parameter of the plug-in set in either the input channel 2 or the input channel 3, as a parameter of a plug-in to be inserted into the input channel 4.

In addition, the CPU 18, in a case of finding no corresponding plug-in, may not mount a plug-in to the copy-destination channel. For example, in a case in which the copy-source channel is stereo, the copy-destination channel is monaural, and no plug-in of the same type as or similar type to a plug-in corresponding to the monaural reproduction system is available, the CPU 18 does not mount a plug-in.

In addition, in a case in which a stereo gain changing plug-in is set in the copy-source channel, and the copy-destination channel is monaural, the CPU 18 determines that no corresponding plug-in is available and may not mount a plug-in. In stereo gain setting, a parameter value of each channel may be completely different from each other. Therefore, in a case in which a stereo gain changing plug-in is set in the copy-source channel, and the copy-destination channel is monaural, the CPU 18 determines that no corresponding plug-in is available and may not mount a plug-in to the copy-destination channel. However, the CPU 18, by incorporating a value such as an average, the maximum, or the minimum of a gain of each stereo channel, into a monaural parameter value, may mount a monaural gain changing plug-in. In addition, the CPU 18, by directly incorporating a parameter shared between stereo channels into a monaural parameter value, may mount a monaural plug-in. In addition, in a case in which a monaural gain changing plug-in is set in the copy-source channel, and the copy-destination channel is stereo, the CPU 18 may set the same gain in each stereo channel and mount a stereo gain changing plug-in.

It is to be noted that the CPU 18 may display a warning in a case in which no corresponding plug-in is available.

Moreover, the CPU 18, in a case in which a plug-in to be copied includes an auto mixer, may copy only information relating to assignment of a channel, without copying a parameter. The auto mixer is a plug-in that receives an input of a signal of a plurality of channels, performs a gain adjustment, and outputs the signal of the plurality of channels. The auto mixer sets a high gain to a high-level input signal, and sets a low gain to a low-level input signal. As a result, the auto mixer makes the sound of a high-level channel stand out, and improves an SN ratio.

The auto mixer changes a gain dynamically according to the level of an input signal. In other words, the parameter of the auto mixer changes dynamically. Therefore, the CPU 18, in a case of copying the plug-in of the auto mixer, copies only the information according to the assignment of the plurality of input and output channels, and does not copy a value of the parameter.

Finally, the present preferred embodiment is illustrative in all points and should not be construed to limit the present invention. The scope of the present invention is defined not by the foregoing preferred embodiment but by the following claims. Further, the scope of the present invention is intended to include all modifications within the scopes of the claims and within the meanings and scopes of equivalents.

What is claimed is:

1. An audio signal processing apparatus comprising:
a user interface;
a memory storing instructions; and
a processor that implements the instructions to execute a plurality of tasks, including:
 a preset setting task that receives, via the user interface, setting of a preset that defines a parameter to be copied;

a copy-source selecting task that receives, via the user interface, a selection of a copy-source channel;
a preset selecting task that receives, via the user interface, a selection of the preset;
a plug-in determining task that determines whether the setting of the selected preset includes information about a plug-in;
a plug-in mounting task that mounts a corresponding plug-in, in a case where the plug-in determining task determines that the setting of the selected preset includes the information about the plug-in;
a copy-destination selecting task that receives, via the user interface, a selection of a copy-destination channel; and
a copying task that copies the parameter of the selected preset to be copied from the copy-source channel to the copy-destination channel,
wherein the copying task copies a parameter set to the corresponding plug-in to the copy-destination channel in a case where the plug-in mounting task mounts the corresponding plug-in.

2. The audio signal processing apparatus according to claim 1, wherein the plug-in mounting task:
compares a reproduction system of the copy-source channel and a reproduction system of the copy-destination channel; and
in a case where the copy-source channel and the copy-destination channel provide different reproduction systems, mounts a plug-in, of the reproduction system of the copy-destination channel, that is a same or similar type as the plug-in of the copy-source channel.

3. The audio signal processing apparatus according to claim 1, wherein the plug-in mounting task, in a case where the corresponding plug-in is unavailable, does not mount any corresponding plug-in.

4. The audio signal processing apparatus according to claim 3, wherein the plurality of tasks include:
a warning task that issues a warning notice in a case where the corresponding plug-in is unavailable.

5. The audio signal processing apparatus according to claim 1, wherein:
the plurality of tasks include a resource determining task that determines whether a resource necessary for a plug-in to be mounted is available, and
the plug-in mounting task, in a case where the resource is unavailable, does not mount the corresponding plug-in.

6. The audio signal processing apparatus according to claim 5, wherein the plurality of tasks include a warning task that, in a case where the resource determining task determines that the resource is unavailable, issues a warning notice.

7. The audio signal processing apparatus according to claim 5, wherein the resource determining task has determined that the resource necessary for a plug-in to be mounted is available before the copying task copies the parameter of the copy-source channel to the copy- destination channel.

8. The audio signal processing apparatus according to claim 1, wherein the copying task, in a case where the setting of the preset includes information relating to a plug-in that is an auto mixer, which receives an input of a signal of a plurality of channels, performs a gain adjustment, and outputs the signal of the plurality of channels, copies information according to assignment of the plurality of channels, without copying a value of the parameter.

9. A method of processing an audio signal using a processor and a user interface, the method comprising:
receiving, via the user interface, setting of a preset that defines a parameter to be copied;
receiving, via the user interface, a selection of a copy-source channel;
receiving, via the user interface, a selection of the preset;
determining whether the setting of the selected preset includes information about a plug- in;
mounting a corresponding plug-in, in a case where the determining determines that the setting of the selected preset includes the information about the plug-in;
receiving, via the user interface, a selection of a copy-destination channel; and
copying the parameter of selected present to be copied from the copy-source channel to the copy-destination channel,
wherein the copying copies a parameter set to the corresponding plug-in to the copy-destination channel in a case where the mounting mounts the corresponding plug-in.

10. The method for processing an audio signal according to claim 9, wherein the mounting:
compares a reproduction system of the copy-source channel and a reproduction system of the copy-destination channel; and
in a case where the copy-source channel and the copy-destination channel provide different reproduction systems, mounts a plug-in, of the reproduction system of the copy-destination channel, that is a same or similar type as the plug-in of the copy-source channel.

11. The method for processing an audio signal according to claim 9, wherein the mounting, in a case where the corresponding plug-in is unavailable, does not mount any corresponding plug-in.

12. The method for processing an audio signal according to claim 11, further comprising:
issuing a warning notice in a case where the resource is determined to be unavailable.

13. The method for processing an audio signal according to claim 9, further comprising:
determining, in a case where the determining determines whether a resource necessary for a plug-in to be mounted is available,
wherein the mounting, in a case where the resource is determined to be unavailable, does not mount the corresponding plug-in.

14. The method for processing an audio signal according to claim 13, further comprising issuing a warning notice in a case where the resource is determined to be unavailable.

15. The method for processing an audio signal according to claim 13, wherein the determining determines that the resource necessary for a plug-in to be mounted is available before the copying copies the parameter of the copy-source channel to the copy-destination channel.

16. The method for processing an audio signal according to claim 9, wherein the copying, in a case where the setting of the preset includes information relating to a plug-in that is an auto mixer, which receives an input of a signal of a plurality of channels, performs a gain adjustment, and outputs the signal of the plurality of channels, copies information according to assignment of the plurality of channels, without copying a value of the parameter.

17. A non-transitory computer readable storage medium storing a program executable by a processor of an audio signal processing apparatus that includes a user interface to execute a method comprising:
receiving, via the user interface, setting of a preset that defines a parameter to be copied;

receiving, via the user interface, a selection of a copy-source channel;

receiving, via the user interface, a selection of the preset;

determining whether the setting of the selected preset includes information about a plug-in;

mounting a corresponding plug-in, in a case where the determining determines that the setting of the selected preset includes the information about the plug-in;

receiving, via the user interface, a selection of a copy-destination channel; and copying the parameter of selected present to be copied from the copy-source channel to the copy-destination channel, wherein the copying copies a parameter set to the corresponding plug-in to the copy-destination channel in a case where the mounting mounts the corresponding plug-in.

\* \* \* \* \*